United States Patent [19]

Stender

[11] 4,004,776
[45] Jan. 25, 1977

[54] BALL VALVE
[75] Inventor: Carl H. Stender, Corpus Christi, Tex.
[73] Assignee: Champlin Petroleum Company, Fort Worth, Tex.
[22] Filed: Jan. 17, 1975
[21] Appl. No.: 541,713
[52] U.S. Cl. .............................. 251/315; 251/368; 137/375
[51] Int. Cl.² .......................................... F16K 5/06
[58] Field of Search .......... 251/315, 368, 304, 306, 251/309; 137/375; 92/223; 427/423, 376; 48/194

[56] References Cited
UNITED STATES PATENTS

| | | | |
|---|---|---|---|
| 2,410,405 | 11/1946 | Cornelius | 92/223 |
| 2,501,755 | 3/1950 | Bent | 251/368 |
| 2,926,649 | 3/1960 | Hicks | 92/223 |
| 3,167,300 | 1/1965 | Kaiser | 251/315 |
| 3,264,718 | 8/1966 | Paul, Jr. | 251/368 |
| 3,430,613 | 3/1969 | Barnes | 251/368 |
| 3,463,192 | 8/1969 | Herion, Jr. | 251/368 |
| 3,508,573 | 4/1970 | Smith | 137/375 |
| 3,709,717 | 1/1973 | Hamling | 427/376 |
| 3,814,381 | 6/1974 | Yopp | 251/315 |

FOREIGN PATENTS OR APPLICATIONS
687,841  6/1964  Canada ............................ 251/315

Primary Examiner—William R. Cline
Assistant Examiner—H. Jay Spiegel
Attorney, Agent, or Firm—Wofford, Felsman, Fails & Zobal

[57] ABSTRACT

The specification discloses a ball valve comprising a valve body having a ball receiving cavity with aligned inlet and outlet passages leading thereto. Located in the cavity are two ring-shaped seats and a ball rotatably supported in the seats. The ball has an opening formed therethrough. Means is provided for rotating the ball to an open position where its opening is aligned with the inlet and outlet passages and to a closed position where its opening is out of alignment with the inlet and outlet passages. The ball is coated with chrome oxide and the ball seats are formed of cast iron. The ball and seats are lapped to a close tolerance fit. O-rings are provided for forming a seal between the back side of the seats and the valve body.

2 Claims, 4 Drawing Figures

BALL VALVE

BACKGROUND OF THE INVENTION

This invention relates to ball valves and more particularly to improvements to ball valves to allow the valves to operate more effectively over longer periods of time without leakage.

In refining operations, in a moving bed catalytic reformer, a bed of catalyst is moved in batches through vessels and communicating conduits which employ valves for flow control purposes. Hydrogen pressure of the order of 150 psi is employed for transferring the catalyst through the conduits and hence through the valves. For successful operation of the process, the valves must hold hydrogen pressure without leakage. Due to the small size of the hydrogen molecules, difficulties have been experienced in finding a suitable valve which will hold the hydrogen pressure without leakage after repeated use.

One type of valve which has been tried is a ball valve which comprises a valve body having a ball receiving cavity with aligned inlet and outlet passages leading to the cavity. A stainless steel ball with an opening formed therethrough is rotatably supported in the cavity between the inlet and outlet passages. Means is provided for rotating the ball to an open position wherein its opening is aligned with the inlet and outlet passages and to a closed position wherein its opening is out of alignment with the inlet and outlet passages. Sealing is accomplished by two ring-shaped seats located in the valve body on opposite sides of the cavity for engagement with the ball and which define a portion of the inlet and outlet passages respectively. These seats each comprise a seating material, supported in a metal ring, and which has a seating surface for engagement with the ball. The seating material also engages the valve body on the back side of the ring. The seating material may be of carbon-graphite or Teflon or it may be formed of Armco iron, which is virtually pure iron, or of McCannalloy 88, which is a nickel-base alloy.

Ball valves of this type have been tried in a catalyst transfer system, however, it has been found that they leak soon after installation requiring the complete catalyst transfer system to be shut down.

SUMMARY OF THE INVENTION

It is an object of the present invention to provide an improved ball valve of the type mentioned above which can operate under hydrogen pressure for many on-off cycles, with no leakage.

In the ball valve of the present invention, the ball employed has a hard outer surface formed by a thin layer of material coated thereon. Each ring-shaped seat comprises an annular cast iron member having a concave seating surface adapted to engage the ball. A resilient O-ring is provided for forming a seal between the back side of each seat and the wall structure of the valve body. The ball and the concave seating surfaces of the annular cast iron members are lapped to a close tolerance fit.

In a further aspect, the thin layer of material coating the ball comprises a ceramic material which, in the preferred embodiment, is formed of chrome oxide.

In another embodiment, each ring-shaped seat is formed of an annular ring, L-shaped in cross section. The annular cast iron member is supported in the "L" of the L-shaped ring. Each L-shaped ring has an annular groove formed in the back side thereof with an O-ring mounted in the annular groove.

BRIEF DESCRIPTION OF THE DRAWINGS

In FIG. 1, the ball of the valve is located in a closed position while in FIG. 2, the ball of the valve is rotated 90° to an open position;

DETAILED DESCRIPTION OF THE INVENTION

Figure 1:
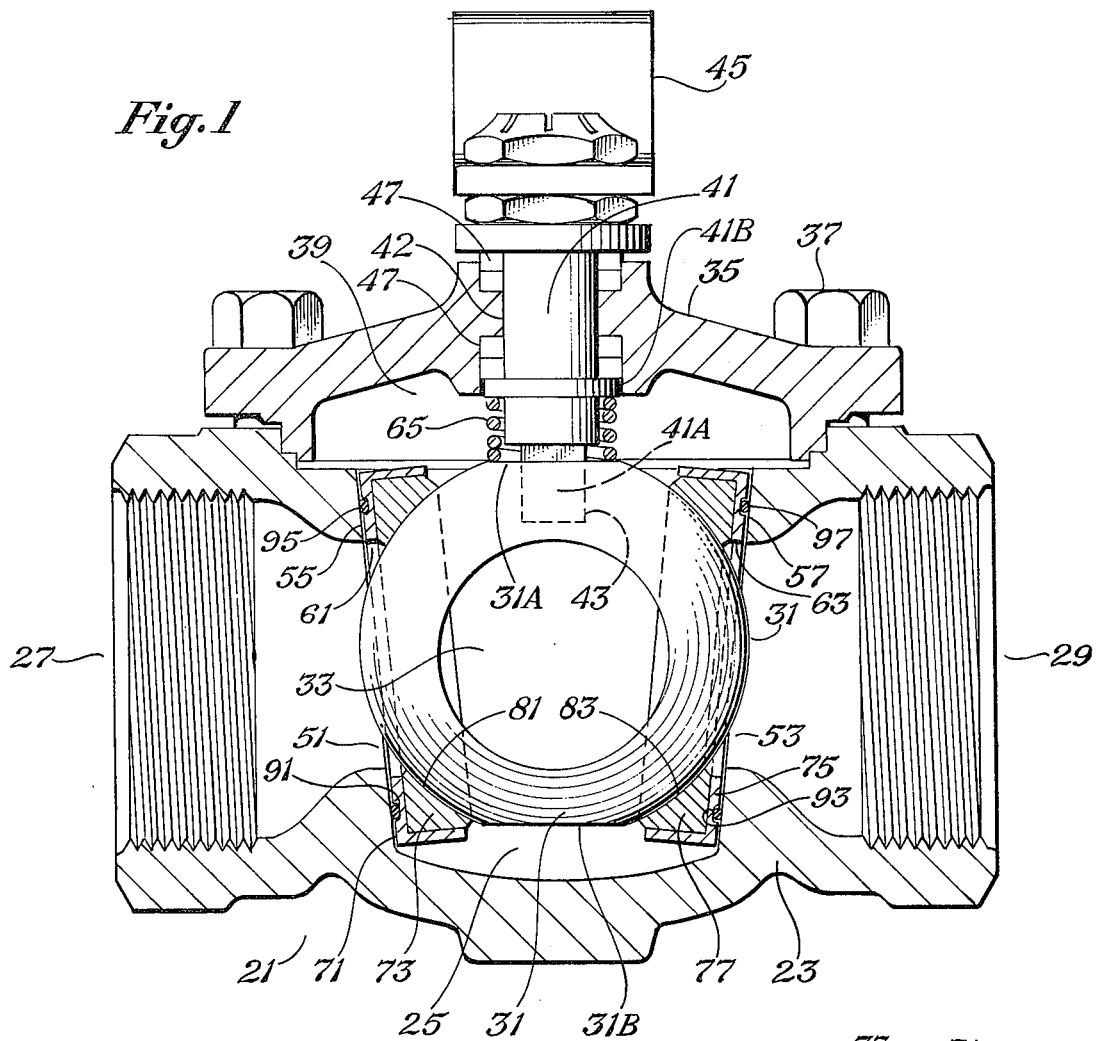
FIGS. 1 and 2 are cross sectional views of the ball valve incorporating the present invention.
Figure 3:
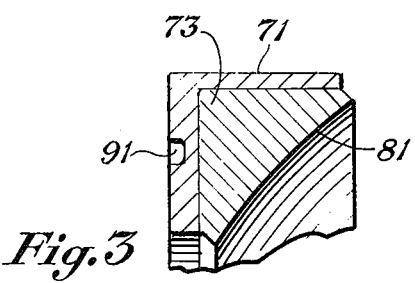
FIG. 3 is an enlarged cross sectional view of a portion of one of the ring seats of FIGS. 1 and 2.
Figure 2:
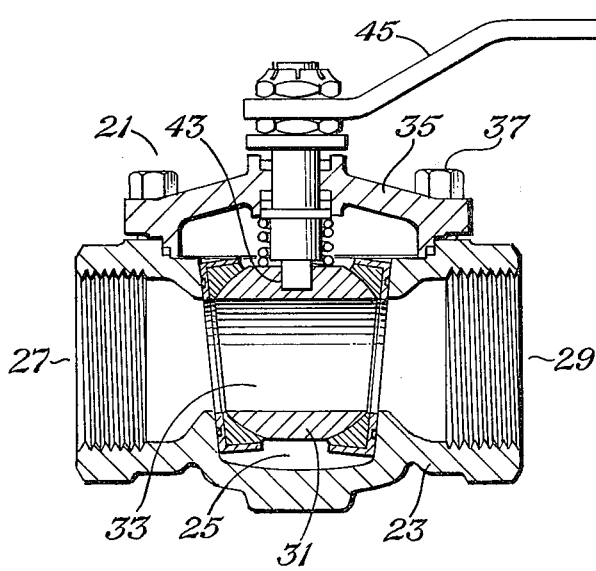

Referring now to FIGS. 1 and 2, the ball valve is identified at 21. It comprises a valve body 23, having a ball receiving cavity 25 with aligned inlet and outlet passages 27 and 29 leading to the cavity. A ball 31 is rotatably supported in the cavity between the inlet and outlet passages. The ball has an opening or passageway 33 formed therethrough. A cover or bonnet 35 is connected to the top of the valve body by way of bolts 37. The cover defines a chamber 39 to which the top of the ball 31 is exposed. A stem 41 extends through an aperture 42 formed in the top of the cover and to the chamber 39 where its lower end 41A is fitted into an opening or socket 43 formed in the top of the ball. The cross section of the end 41A of the stem and the opening or socket 43 are rectangular such that rotation of the stem 42 causes the ball to rotate. The top of the stem 41 is splined to a handle 45 such that rotation of the handle rotates the stem and hence the ball 31. Seals 47 are located around the stem on opposite sides of the cover 35.

Two ring-shaped seats 51 and 53 are supported on opposite sides of the cavity for engaging opposite sides of the ball respectively for forming a seal between the seats and the ball. The back side of the seats engage shoulders 55 and 57 of the valve body for forming a seal between the back sides of the seats and the valve body. The inside surfaces 61 and 63 of the seats 51 and 53 define a portion of the inlet and outlet passages. As illustrated, the seats 51 and 53 are supported at an angle relative to the vertical and the ball is biased in place within the seats by way of a coil spring 65. The top of the spring 65 engages the shoulder 41B of the stem while the bottom of the spring engages the top 31A of the ball 31, which has been machined flat. It is noted that the bottom 31B of the ball 31 also has been machined flat. The spring compensates for ball and seat wear in that the spring pressure maintains the ball in the seats which in turn are biased in the valve body.

In order to increase the effective sealing lifetime of the ball valve, improvements have been made to the valve. These include the formation of a harder surface on the ball; the formation of harder ball seats; the formation of a close tolerance fit between the ball and its seat; and the use of resilient O-rings on the back side of the seats.

The ball is spherical except for the top and bottom which are machined flat and the sides where the aperture 33 extends through the ball. The ball body may be formed of carbon steel for cold service use and an alloy, when used in hydrogen service above 550° F such as in the platforming process. Most grades of steel and chrome-nickel alloys and other alloys may be used depending upon the process requirements. For example, Hastelloy C may be used in wet hydrochloric acid gas service.

Figure 4:
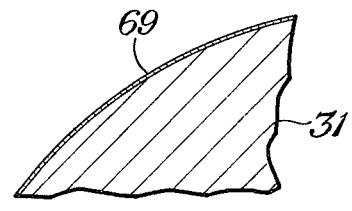
FIG. 4 is an enlarged cross sectional view of a portion of the ball of the valve illustrating its hardened outer layer.

The hardness of the surface of the ball is increased by coating it with a thin layer of hard ceramic material which, in the preferred embodiment, is chrome oxide. The layer of the chrome oxide is identified at 69 in FIG. 4. The coating process is known as the plasma spray process. After the ball has been coated, it usually is not perfectly round and is lapped to remove the high spots. The coating thickness is of the order of 0.0075 of an inch, which is sufficient to allow the high spots of the coating to be removed without removing all of the coating down to the base metal.

In the lapping process, the coated ball is first checked for roundness by applying blueing to a special jig made into the shape of a seat and lightly rubbing the jig over the ball surface. Irregularities show up by the presence of blueing on the high spots and the absence of blueing at the low spots. The jig then is used with a diamond dust compound to lap the ball smooth. The diamond dust employed is Amplex pure diamond compound No. 9-WS which is water soluble. The particle size is 9 microns, which corresponds to 1,800 grit. Care is taken to avoid cutting the coating off down to the base metal. Next, the finished ball and another jig is used to lap the seats.

The ring-shaped seats each comprise a stainless steel ring, L-shaped in cross section, having a cast iron insert pressed into the ring and formed to have its ball seating surface to conform to the outside diameter of the ball 31. The ring and annular cast iron insert of seat 51 are identified at 71 and 73 while the ring and annular cast iron insert of seat 53 are identified at 75 and 77 respectively. The ball seating surface of insert 73 is identified at 81 while the ball seating surface of insert 77 is identified at 83. Formed in the back side of the rings 71 and 75 are annular grooves 91 and 93 respectively in which are inserted resilient O-rings 95 and 97, as will be described in more detail subsequently.

The inserts 73 and 77 are formed of a good grade of dense cast iron that has little slag inclusion or bubbles in it. In the preferred embodiment, the cast iron employed is identified as ASTM A-48, class 40.

In using the finished ball to lap the seats, the ball and one seat at a time are positioned in a jig and a fine grit lapping compound is used to smooth the concave cast iron seating surface. In this respect, the side of the ball which will engage the cast iron seating surface 81 of seat 51 will be employed to lap this surface and the side of the ball which will engage the cast iron surface 83 of seat 53 will be employed to lap this surface. The result is a matched, lapped ball and seat set ready to install in a valve body. The lapping compound employed for lapping the ring-shaped seats with the ball may be silicon carbide or aluminum oxide in paste form.

In assembling the ball valve, the ball and seats are inserted in the cavity of the valve body; the bonnet and stem assembly are aligned such that the stem fits into the socket of the ball and the bonnet is bolted in place. In the assembled position, the seats 51 and 53 are located in the cavity on opposite sides thereof, as illustrated, in alignment with the inlets and outlets of the valve respectively. The seating surfaces 81 and 83 of the inserts engage opposite sides of the ball and the O-rings engage surfaces 55 and 57 of the valve body. Thus, the seating surfaces 81 and 83 form a seal between the ball and the seat and the O-rings form a seal between the back side of the seats and the surfaces 55 and 57 of the valve body. Since the seats form a seal between the ball and the valve body, the inside surfaces 61 and 63 of the seats 51 and 53 form a portion of the inlet and outlet passages.

After the valve has been assembled, it is bench tested with 100 psig air. It must be bubbled tight (no visible air bubbles leaking through a column of water) before it is acceptable for use.

The 0-rings are formed of an elastomer material such as Viton-A neoprene rubber, which is preferred because of its elasticity. If the ball is not perfectly round, the flexible O-rings allow some movement of the seats while the ball is rotating. Thus, the O-rings maintain a good seal between the back side of the seats and the valve body and prevent the ball from locking in the seats in the event it is not perfectly round. Since the chrome oxide coating and the cast iron inserts are lapped to a close tolerance fit, a good seal is formed between the seats and the ball. The chrome oxide coating is a very hard surface while the cast iron inserts present a harder ball seating surface than the materials heretofore used (carbon-graphite, teflon, Armco iron or McCannalloy 88). Thus, wear between the ball and the seats is minimized whereby the valves may be employed for many on-off cycles of operation without leakage. In tests conducted, it has been found that the valves may be operated for 5,000 cycles under hydrogen pressure without leakage.

The relative hardness of chrome oxide, cast iron, and stainless steel may be expressed by the Vickers Pyramid Number at 300 gms (VPN 300) hardness rating. Under this rating, the chrome oxide coating has a relative hardness of 1,300, the stainless steel has a relative hardness of 300, and cast iron has a relative hardness of 300.

I claim:
1. A ball valve comprising:
 a valve body having a ball receiving cavity with aligned inlet and outlet passages leading to said cavity,
 a ball rotatably supported in said cavity between said inlet and outlet passages,
 said ball having a hard outer surface formed by a thin layer of ceramic material formed of chrome oxide coated thereon and having an opening extending through said ball,
 first and second ring-shaped seats located in said valve body on opposite sides of said cavity,
 the inner surfaces of said first and second ring shaped seats defining a portion of said inlet and outlet passages respectively,
 each ring-shaped seat comprising an annular cast iron member having a concave seating surface adapted to engage said ball,
 a resilient O-ring located between the back side of each ring-shaped seat and wall structure of said valve body to form a seal between the back side of said seats and said wall structure of said valve body,
 means for rotating said ball to an open position wherein its opening is aligned with said inlet and outlet passages and to a closed position wherein its opening is out of alignment with said inlet and outlet passages,
 said ball and said concave seating surfaces of said annular cast iron members being lapped to a close tolerance fit.
2. The ball valve of claim 1 wherein:

each ring-shaped seat comprises an annular ring member, L-shaped in cross section,
said annular cast iron members being supported in the "L" of said annular ring members respectively, the back side of each annular ring member having an annular groove formed therein,
said O-rings being mounted in said annular grooves of said annular ring members respectively.

* * * * *